(12) United States Patent
Shi et al.

(10) Patent No.: US 12,471,058 B2
(45) Date of Patent: *Nov. 11, 2025

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Zhihua Shi, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,746

(22) Filed: Jun. 26, 2023

(65) Prior Publication Data

US 2023/0345415 A1    Oct. 26, 2023

Related U.S. Application Data

(63) Continuation of application No. 17/658,931, filed on Apr. 12, 2022, now Pat. No. 11,737,053, which is a
(Continued)

(51) Int. Cl.
*H04W 68/00* (2009.01)
*H04W 4/06* (2009.01)

(52) U.S. Cl.
CPC ........... *H04W 68/005* (2013.01); *H04W 4/06* (2013.01)

(58) Field of Classification Search
CPC . H04W 68/02; H04W 76/048; H04W 72/005; H04W 56/001
See application file for complete search history.

(56) References Cited

U.S. PATENT DOCUMENTS

| 5,434,798 A | 7/1995 | Madebrink et al. |
| 2013/0184013 A1 | 7/2013 | Chao |

(Continued)

FOREIGN PATENT DOCUMENTS

| CN | 102740459 A | 10/2012 |
| CN | 102821358 A | 12/2012 |

(Continued)

OTHER PUBLICATIONS

Guangdong OPPO Mobile Telecommunications Corp., International Search Report and Written Opinion, PCT/CN2017/110968, Aug. 6, 2018, 14 pgs.

(Continued)

*Primary Examiner* — Muthuswamy G Manoharan
(74) *Attorney, Agent, or Firm* — PERKINS COIE LLP

(57) ABSTRACT

Embodiments of this application provide a wireless communication method and a device, to improve flexibility in an aspect of paging or an aspect of broadcast message transmission. The method includes: determining, by a network device, a scheme of performing paging or broadcast message transmission to a terminal device, where the determined scheme is one of a first scheme and a second scheme, where in the first scheme, a first parameter set is used for performing paging or broadcast message transmission at a specific frequency point, and in the second scheme, a second parameter set is used for performing paging or broadcast message transmission at a specific frequency point; and performing, by the network device, paging or broadcast message transmission to the terminal device at the specific frequency point according to the determined scheme.

10 Claims, 6 Drawing Sheets

Related U.S. Application Data continuation of application No. 16/874,454, filed on May 14, 2020, now Pat. No. 11,330,552, which is a continuation of application No. PCT/CN2017/110968, filed on Nov. 14, 2017.

(56) References Cited

U.S. PATENT DOCUMENTS

| | | | |
|---|---|---|---|
| 2016/0100442 | A1 | 4/2016 | Xu |
| 2016/0191216 | A1 | 6/2016 | Ma et al. |
| 2017/0111930 | A1 | 4/2017 | Rajagopal |
| 2017/0150419 | A1 | 5/2017 | Li et al. |
| 2017/0164349 | A1 | 6/2017 | Zhu et al. |
| 2018/0199310 | A1 | 7/2018 | Islam et al. |
| 2018/0310276 | A1 | 10/2018 | Zhang |
| 2019/0069271 | A1* | 2/2019 | Reial .................... H04W 68/02 |
| 2019/0166578 | A1 | 5/2019 | Chang et al. |
| 2020/0178253 | A1 | 6/2020 | Gao et al. |
| 2020/0245288 | A1 | 7/2020 | Liu |
| 2020/0314776 | A1 | 10/2020 | Harada et al. |

FOREIGN PATENT DOCUMENTS

| | | | |
|---|---|---|---|
| CN | 102843768 | A | 12/2012 |
| CN | 103139880 | A | 6/2013 |
| CN | 103874009 | A | 6/2014 |
| CN | 106231614 | A | 12/2016 |
| CN | 106376050 | A | 2/2017 |
| CN | 106788931 | A | 5/2017 |
| CN | 107295542 | A | 10/2017 |
| JP | 2012521731 | A | 9/2012 |
| JP | 2020109886 | A | 7/2020 |
| RU | 2510158 | C2 | 3/2014 |
| WO | 2008022782 | A1 | 2/2008 |
| WO | 2014094877 | A1 | 6/2014 |
| WO | 2015154296 | A1 | 10/2015 |
| WO | 2016149920 | A1 | 9/2016 |
| WO | 2017034194 | A1 | 3/2017 |
| WO | 2017041748 | A1 | 3/2017 |
| WO | 2017122752 | A1 | 7/2017 |
| WO | 2017157348 | A1 | 9/2017 |
| WO | 2017171351 | A2 | 10/2017 |
| WO | 2017176438 | A1 | 10/2017 |
| WO | 2017180030 | A1 | 10/2017 |

OTHER PUBLICATIONS

Huawei, HiSilicon, "Finalization of NR Paging," 3GPP TSG RAN WGI Meeting 90bis, R1-1717052, Prague, Czech Republic, Oct. 9-13, 2017, 5 pgs.

CATT, "NR Paging Channel," 3GPP TSG RAN WGI Meting 90bis, R1-1717801,Prague, Czech Republic, Oct. 9-13, 2017, 3 pgs.

Qualcomm Incorporated,"Paging Design Consideration," 3GPP TSG-RAN WG1 Meeting #90bis, R1-1718530, Prague, Czech Republic, Oct. 9-13, 2017, 10 pgs.

Huawei et al: "Offline summary for AI 7.1.3 on Paging for NR", 3GPP Draft; R1-1719037 Summary on Paging V 3.0,3rd Generation Partnership Project(3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 13, 2017 (Oct. 13, 2017), XP051353528, Retrieved from the Internet: URL: http://www.3gpp. org/ftp/tsg_ran/WG1_RL1/TSGR1_90b/Docs/[ retrieved on Oct. 13, 2017]* the whole document *.

LG Electronics Inc: "Summary of offline discussion #06 on NR Paging Occasion", 3GPP Draft; R2-1712014 Summary of Offline Discussion #06 NR Paging Ocassion, 3rd Generation Partnership Project (3GPP), Mobile Competence Centre; 650, Route Des Lucioles; F-06921 Sophia-Antipolis Ce, vol. RAN WG2, No. Prague, Czech Republic; Oct. 9, 2017-Oct. 13, 2017; Oct. 3, 2017 (Oct. 13, 2017), XP051356010, the whole document *.

ZTE Corporation et al: "Calculation of paging occasion in NR", 3GPP Draft; R2-1710425 Calculation of Paging Occasion in NR, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017; Oct. 8, 2017 (Oct. 8, 2017), XP051342470, * the whole document *.

Ericsson: "Paging design", 3GPP Draft; R1-1718714_Paging, 3rd Generation Partnership Project (3GPP), Mobile Competence Centre; 650, Route Des Lucioles; F-06921 Sophia-Antipolis Cedex; France vol. RAN WG1, No. Prague, Czech Republic; Oct. 9, 2017-Oct. 13, 2017, Oct. 8, 2017 (Oct. 8, 2017), XP051341887, Retrieved from the Internet: URL: http://www.3gpp. org/ftp/Meetings_3GPP_SYNC/RAN1/Docs/ [ retrieved on Oct. 8, 2017]* the whole document *.

Supplementary European Search Report in the European application No. 17932242.5, mailed on Oct. 26, 2020.

Notice of Allowance of the Russian application No. 2020119544, issued on Feb. 24, 2021.

First Office Action of the Canadian application No. 3082495, issued on Jun. 17, 2021.

First Office Action of the Indian application No. 202017024830, issued on Jun. 25, 2021.

3GPP TSG RAN WG1 Meeting 90bis R1-1718771, Prague, Czech Republic, Oct. 9-13, 2017, Agenda Item: 7.1.3, Source: Huawei, HiSilicon, Title: Offline summary for AI 7.1.3 on Paging for NR, Document for: Discussion and decision.

First Office Action of the Korean application No. 10-2020-7016994, issued on Jun. 29, 2021.

First Office Action of the European application No. 17932242.5, issued on Nov. 3, 2021.

Samsung, and "Summary on A.I.7.1.2.3 : Remaining details on other system information delivery" [online] and 3GPP TSGRANWG1 #90b R1-1718792, Internet<URL:http://www.3gpp.org/ftp/tsg_ran/WG1_RL1/TSGR1_90 b/Docs/R1-1718792.zip>, Oct. 13, 2017.

Vivo, and "Remaining details on NR paging design"[online]3GPP TSG RAN WG1 #90b R1-1717462, Internet<URL: http://www.3gpp.org /ftp/tsg_ran/WG1_RL1/TSGR1_90b/Docs/R1-1717462.zip>, Oct. 13, 2017.

Huawei, Summary 6.1.3 Paging design [online], and 3GPP TSG RAN WG1 adhoc_NR_AH_1709 R1-1716799, Internet<URL:http://www.3gpp.org/ftp/tsg_ran/WG1_RL1/TSGR1_AH/NR_AH_1709/Docs/R1-1716799.zip>, Sep. 21, 2017.

First Office Action of the Japanese application No. 2020-544081, issued on Dec. 17, 2021.

Written Opinion of the Singaporean application No. 11202004452Y, issued on Feb. 10, 2022.

Final Office Action of the U.S. Appl. No. 16/874,454, issued on Dec. 11, 2020.

Non-Final Office Action after RCE of the U.S. Appl. No. 16/874,454, issued on Jun. 16, 2021.

Final Office Action after RCE of the U.S. Appl. No. 16/874,454, issued on Sep. 27, 2021.

Non-Final Office Action of the U.S. Appl. No. 16/874,454, issued on Jun. 15, 2020.

Notice of Advisory Action of the U.S. Appl. No. 16/874,454, issued on Mar. 18, 2021.

Second Office Action of the Canadian application No. 3082495, issued on Jun. 9, 2022.

Notice of rejection of Decision of the Japanese application No. 2020-544081, issued on Jul. 19, 2022.

First Office Action of the Australian application No. 2017440250, issued on Jun. 21, 2022.

3GPP TSG RAN WG1 Meeting 90bis R1-1718474, Prague, Czech Republic, Oct. 9-13, 2017, Agenda Item: 7.1.2.2, Source: InterDigital Inc., Title: On Remaining Issues of Remaining Minimum System Information Delivery, Document for: Discussion and Decision.

3GPP TSG RAN WG1 Meeting #90bis R1-1717353, Prague, Czech Republic, Oct. 9-13, 2017, Source: Intel Corporation, Title: Remaining Details of SS Blocks, Agenda item: 7.1.1, Document for: Discussion and Decision.

Huawei, 3GPP TSG RAN WG1 Meeting # NR-AH3 R1-1716895, Nagoya, Japan, Sep. 18-21, 2017, Agenda item: 6.1.3, Document for decision, Title: Summary on remaining details on Paging.

(56) References Cited

OTHER PUBLICATIONS

First Office Action of the Korean application No. 10-2022-7006839, issued on Jun. 28, 2022.
Ericsson, "Further details on mixed numerologies and idle mode operation", 3GPP TSG-RAN WG2 Meeting #98 Tdoc R2-1704395, Hangzhou, P.R. China, May 15-19, 2017.
First Office Action of the Chinese application No. 202010489392.8, issued on Nov. 16, 2022.
Supplementary European Search Report in the European application No. 22198561.7, mailed on Jan. 13, 2023.
3GPP TSG RAN WG1 Meeting #90 R1-1713901 Prague, Czech Republic, Aug. 21-25, 2017, Source: NTT Docomo, Inc., Title: Discussion on paging design for NR, Agenda Item: 6.1.1.3, Document for: Discussion and Decision. 6 pages.
3GPP TSG RAN WG1 Meeting #87 R1-1612620 Reno, USA, Nov. 14-18, 2016, Source: Sharp, Title: Subcarrier spacing of DL synchronization signal and broadcast channel in NR, Agenda Item: 7.1.2.1, Document for: Discussion and Decision. 4 pages.
3GPP TSG RAN WG1 AH_NR Meeting R1-1701042, Spokane, USA, Jan. 16-20, 2017, Agenda Item: 5.1.1.2, Source: ASUSTek, Title: Signaling of broadcast channel considering multiple numerologies, Document for: Discussion and Decision. 3 pages.
Second Office Action of the Chinese application No. 202010489392.8, issued on May 18, 2023. 16 pages.
First Office Action of the U.S. Appl. No. 17/658,931, issued on Sep. 19, 2022. 21 pages.
Notice of Allowance of the U.S. Appl. No. 17/658,931, issued on Mar. 24, 2023. 12 pages.
Samsung, "Numerology configuration in NR", 3GPP TSG-RAN WG2 NR #99 Meeting R2-1708089 (Resubmission of R2-1706431), Berlin, Germany, Aug. 21-25, 2017, the whole document. 7 pages.
Samsung, "Numerology configuration in NR", 3GPP TSG-RAN WG2 Meeting 97bis R2-1703330, Spokane, Washington, USA: Apr. 3-7, 2017, the whole document. 6 pages.
Notice of Allowance of the Chinese application No. 202010489392.8, issued on Nov. 20, 2023. 7 pages with English translation.
Hearing Notice of the Indian application No. 202017024830, issued on Dec. 6, 2023. 2 pages with English translation.
First Office Action of the Japanese application No. 2022-185175, issued on Jan. 23, 2024. 13 pages with English translation.
First Office Action of the Brazilian application No. BR1120200093572, issued on Apr. 16, 2024. 8 pages with English translation.
First Office Action of the Chinese application No. 201780095942.4, issued on Apr. 22, 2024. 29 pages with English translation.
First Office Action of the Mexican application No. MX/a/2020/004983, issued on Jun. 8, 2023. 6 pages with English translation.
Corrected Notice of Allowance of the U.S. Appl. No. 17/658,931, issued on Jul. 13, 2023. 8 pages.
Third Office Action of the Chinese application No. 202010489392.8, issued on Aug. 30, 2023. 15 pages with English translation.
Ericsson, "Configuration of paging transmissions in multi-beam operation", 3GPP TSG-RAN WG2 #99bis Tdoc R2-1711369, Prague, Czech Republic, Oct. 9-13, 2017, pp. 1-3.
Notice of Allowance of the Chinese application No. 201780095942.4, issued on Sep. 24, 2024. 7 pages with English translation.

* cited by examiner

WIRELESS COMMUNICATION METHOD AND DEVICE

CROSS-REFERENCE TO RELATED APPLICATIONS

This application is a continuation application of U.S. patent application Ser. No. 17/658,931 filed on Apr. 12, 2022, which is a continuation application of U.S. patent application Ser. No. 16/874,454, filed May 14, 2020 now U.S. Pat. No. 11,330,552B2, which is a continuation application of PCT Patent Application No. PCT/CN2017/110968, entitled "WIRELESS COMMUNICATION METHOD AND DEVICE" filed on Nov. 14, 2017. The disclosures of these applications are hereby incorporated by reference in their entirety.

TECHNICAL FIELD

This application relates to the field of communications, and more specifically, to a wireless communication method and a device.

BACKGROUND

In a long term evolution (LTE) system, a network device and a terminal device may determine, within a paging cycle, a paging occasion on which the network device pages the terminal device.

In a future new radio (NR) system, a requirement for communication flexibility is relatively high.

How to improve flexibility in an aspect of paging or another aspect of sending a message is one problem to be resolved urgently.

SUMMARY

Embodiments of this application provide a wireless communication method and a device, to improve flexibility in an aspect of paging or an aspect of broadcast message transmission.

A first aspect provides a wireless communication method, including:
determining, by a network device, a scheme of performing paging or broadcast message transmission to a terminal device, where the determined scheme is one of a first scheme and a second scheme, where
in the first scheme, a first parameter set is used for performing paging or broadcast message transmission at a specific frequency point, and in the second scheme, a second parameter set is used for performing paging or broadcast message transmission at a specific frequency point; and
performing, by the network device, paging or broadcast message transmission to the terminal device at the specific frequency point according to the determined scheme.

Therefore, in this embodiment of this application, the first scheme corresponding to the first parameter set and the second scheme corresponding to the second parameter set may be used by the network device to perform paging or broadcast message transmission, and flexibility of performing paging or broadcast message transmission to the terminal device by the network device may be enhanced.

With reference to the first aspect, in a possible implementation of the first aspect, before the determining, by a network device, a scheme of performing paging or broadcast message transmission to a terminal device, the method further includes:
determining, by the network device, a paging occasion of performing paging to the terminal device; and
the determining, by a network device, a scheme of performing paging or broadcast message transmission to a terminal device includes: determining, by the network device, a scheme of performing paging to the terminal device on the paging occasion.

With reference to the first aspect or the foregoing any possible implementation, in another possible implementation of the first aspect, the first parameter set and the second parameter set respectively includes at least one of a time location that needs to be occupied for performing paging or broadcast message transmission, a time length for performing paging or broadcast message transmission, a subcarrier spacing for performing paging or broadcast message transmission, and a spacing between time locations.

With reference to the first aspect or the foregoing any possible implementation, in another possible implementation of the first aspect, the performing, by the network device, paging or broadcast message transmission to the terminal device includes:
sending, on the time location, a PDCCH and/or a PDSCH used for paging or broadcast message transmission.

With reference to the first aspect or the foregoing any possible implementation, in another possible implementation of the first aspect, each time location corresponds to single beam scanning.

With reference to the first aspect or the foregoing any possible implementation, in another possible implementation of the first aspect, the first parameter set refers to a parameter set used for an actually transmitted synchronization signal block; and the second parameter set does not refer to a parameter set used for an actually transmitted synchronization signal block.

With reference to the first aspect or the foregoing any possible implementation, in another possible implementation of the first aspect, the method further includes:
sending, by the network device, first information to the terminal device, where the first information is used to notify a scheme of performing paging or broadcast message transmission or notify the first parameter set and/or the second parameter set.

With reference to the first aspect or the foregoing any possible implementation, in another possible implementation of the first aspect, the first information is carried in remaining minimum system information RMSI, other system information OSI, on-demand system information, or a radio resource control RRC message.

With reference to the first aspect or the foregoing any possible implementation, in another possible implementation of the first aspect, the determining, by a network device, a scheme of performing paging or broadcast message transmission to a terminal device includes:
determining, by the network device according to a paging occasion of currently performing paging or a time period in which the broadcast message is transmitted, the scheme of performing paging or broadcast message transmission to the terminal device.

With reference to the first aspect or the foregoing any possible implementation, in another possible implementation of the first aspect, the method further includes:
sending, by the network device, second information to the terminal device, where the second information is used to notify an association relationship between the scheme of performing paging or s broadcast message transmission and the time period.

With reference to the first aspect or the foregoing any possible implementation, in another possible implementation of the first aspect, the second information is carried in remaining minimum system information RMSI, other system information OSI, on-demand system information, or a radio resource control RRC message.

With reference to the first aspect or the foregoing any possible implementation, in another possible implementation of the first aspect, the determining, by a network device, a scheme of performing paging or broadcast message transmission to a terminal device includes:
  determining, according to whether a synchronization signal block is sent or there is a candidate sending time location of a synchronization signal block within a time range of performing paging or broadcast message transmission, a scheme of performing paging or broadcast message transmission.

With reference to the first aspect or the foregoing any possible implementation, in another possible implementation of the first aspect, the determining, according to whether a synchronization signal block is sent or there is a candidate sending time location of a synchronization signal block within a time range of performing paging or broadcast message transmission, a scheme of performing paging or broadcast message transmission includes:
  determining, if a synchronization signal block is sent or there is a candidate sending time location of a synchronization signal block within the time range of performing paging or broadcast message transmission, that the scheme of performing paging or broadcast message transmission is the first scheme; or
  determining, if no synchronization signal block is sent or there is no candidate sending time location of a synchronization signal block within the time range of performing paging or broadcast message transmission, that the scheme of performing paging or broadcast message transmission is the second scheme.

With reference to the first aspect or the foregoing any possible implementation, in another possible implementation of the first aspect, the performing, by the network device, paging or broadcast message transmission to the terminal device at the specific frequency point according to the determined scheme includes:
  determining, when the determined scheme is the first scheme, at least one of a time length of an actually transmitted synchronization signal block at the specific frequency point, at least some symbols in a time location, a subcarrier spacing, and a spacing between time locations, as at least one of a time length required for performing paging or broadcast message transmission at the specific frequency point, at least some symbols in a time location, a subcarrier spacing, and a spacing between time locations; and
  performing paging or broadcast message transmission to the terminal device at the specific frequency point according to the determined at least one of the time length, the time location, the subcarrier spacing, and the spacing between the time locations.

With reference to the first aspect or the foregoing any possible implementation, in another possible implementation of the first aspect, the performing paging or broadcast message transmission to the terminal device at the specific frequency point according to the determined time length and/or time location includes:
  performing paging or broadcast message transmission to the terminal device at the specific frequency point by using a beam parameter setting the same as that for sending a synchronization signal block.

With reference to the first aspect or the foregoing any possible implementation, in another possible implementation of the first aspect, the performing, by the network device, paging or broadcast message transmission to the terminal device according to the determined scheme includes:
  when the determined scheme is the second scheme, performing paging or broadcast message transmission to the terminal device on N consecutive time locations at the specific frequency point.

With reference to the first aspect or the foregoing any possible implementation, in another possible implementation of the first aspect, the N time locations occupy Q slots, and a start point of the N time locations is an $M^{th}$ symbol of a first slot of the Q slots, where Q is an integer greater than or equal to 1, and M is an integer greater than or equal to 1.

With reference to the first aspect or the foregoing any possible implementation, in another possible implementation of the first aspect, the performing, by the network device, paging or broadcast message transmission to the terminal device according to the determined scheme includes:
  when the determined scheme is the second scheme, performing paging or broadcast message transmission to the terminal device on N time locations, where the N time locations have at least two neighboring time locations that are inconsecutive.

With reference to the first aspect or the foregoing any possible implementation, in another possible implementation of the first aspect, the N time locations occupy R slots, and each slot includes T time locations, where R is an integer greater than or equal to 1, and T is an integer greater than or equal to 1.

With reference to the first aspect or the foregoing any possible implementation, in another possible implementation of the first aspect, in the each slot, a start point of the T time locations is an $S^{th}$ symbol of the each slot, where S is an integer greater than or equal to 1.

With reference to the first aspect or the foregoing any possible implementation, in another possible implementation of the first aspect, in the each slot, an end point of the T time locations is a last but P−1 symbol of the each slot, where P is an integer greater than or equal to 1.

With reference to the first aspect or the foregoing any possible implementation, in another possible implementation of the first aspect, when T is greater than 1, any two time locations of the T time locations are inconsecutive.

With reference to the first aspect or the foregoing any possible implementation, in another possible implementation of the first aspect, when T is greater than 1, the T time locations have at least two consecutive time locations.

With reference to the first aspect or the foregoing any possible implementation, in another possible implementation of the first aspect, in a same slot, the at least two consecutive time locations and at least two consecutive time locations adjacent to the at least two consecutive time locations are spaced apart by at least one symbol.

A second aspect provides a wireless communication method, including:
  determining, by a terminal device, a scheme in which a network device performs paging or broadcast message transmission to the terminal device, where the determined scheme is one of a first scheme and a second scheme, where
  in the first scheme, a first parameter set is used for performing paging or broadcast message transmission at a specific frequency point, and in the second scheme, a second parameter set is used for performing paging or broadcast message transmission at a specific frequency point; and
  monitoring, by the terminal device at the specific frequency point according to the determined scheme, paging performed by the network device or the broadcast message transmitted by the network device to the terminal device.

Therefore, in this embodiment of this application, the first scheme corresponding to the first parameter set and the second scheme corresponding to the second parameter set may be used by the network device to perform paging or broadcast message transmission, and flexibility of performing paging or broadcast message transmission to the terminal device by the network device may be enhanced.

With reference to the second aspect, in a possible implementation of the second aspect, before the determining, by a terminal device, a scheme in which a network device performs paging or broadcast message transmission to the terminal device, the method further includes:
  determining, by the terminal device, a paging occasion on which the network device performs paging to the terminal device; and
  the determining, by a terminal device, a scheme in which a network device performs paging or broadcast message transmission to the terminal device includes: determining, by the terminal device, a scheme in which the network device performs paging to the terminal device on the paging occasion.

With reference to the second aspect or the foregoing any possible implementation, in another possible implementation of the second aspect, the first parameter set and the second parameter set respectively includes at least one of a time location that needs to be occupied for performing paging or broadcast message transmission, a time length for performing paging or broadcast message transmission, a subcarrier spacing for performing paging or broadcast message transmission, and a spacing between time locations.

With reference to the second aspect or the foregoing any possible implementation, in another possible implementation of the second aspect, the monitoring, by the terminal device, paging performed by the network device or the broadcast message transmitted by the network device to the terminal device includes:
  monitoring, by the terminal device on the time location, to a PDCCH and/or a PDSCH used for paging or broadcast message transmission.

With reference to the second aspect or the foregoing any possible implementation, in another possible implementation of the second aspect, the first parameter set refers to a parameter set used for an actually transmitted synchronization signal block; and the second parameter set does not refer to a parameter set used for an actually transmitted synchronization signal block.

With reference to the second aspect or the foregoing any possible implementation, in another possible implementation of the second aspect, the method further includes:
  receiving, by the terminal device, first information sent by the network device, where the first information is used to notify a scheme of performing paging or broadcast message transmission or notify the first parameter set and/or the second parameter set.

With reference to the second aspect or the foregoing any possible implementation, in another possible implementation of the second aspect, the first information is carried in remaining minimum system information RMSI, other system information OSI, on-demand system information, or a radio resource control RRC message.

With reference to the second aspect or the foregoing any possible implementation, in another possible implementation of the second aspect, the determining, by a terminal device, a scheme in which a network device performs paging or broadcast message transmission to the terminal device includes:
  determining, by the terminal device according to a paging occasion of currently performing paging or a time period in which the broadcast message is transmitted, the scheme in which the network device performs paging or broadcast message transmission to the terminal device.

With reference to the second aspect or the foregoing any possible implementation, in another possible implementation of the second aspect, the method further includes:
  receiving, by the terminal device, second information sent by the network device, where the second information is used to notify an association relationship between the scheme of performing paging or broadcast message transmission and the time period; or
  an association relationship between the scheme in which the network device performs paging or broadcast message transmission to the terminal device and the time period is preset on the terminal device.

With reference to the second aspect or the foregoing any possible implementation, in another possible implementation of the second aspect, the second information is carried in remaining minimum system information RMSI, other system information OSI, on-demand system information, or a radio resource control RRC message.

With reference to the second aspect or the foregoing any possible implementation, in another possible implementation of the second aspect, the determining, by a terminal device, a scheme in which a network device performs paging or broadcast message transmission to the terminal device includes:
  determining, by the terminal device according to whether a synchronization signal block is sent or there is a candidate sending time location of a synchronization signal block within a time range within which the network device performs paging or broadcast message transmission to the terminal device, the scheme in which the network device performs paging or broadcast message transmission to the terminal device.

With reference to the second aspect or the foregoing any possible implementation, in another possible implementation of the second aspect, the determining, by the terminal device according to whether a synchronization signal block is sent or there is a candidate sending time location of a synchronization signal block within a time range within which the network device performs paging or broadcast message transmission to the terminal device, the scheme in which the network device performs paging or broadcast message transmission to the terminal device includes:
  determining, if it is determined, within the time range within which the network device performs paging or broadcast message transmission to the terminal device, that the network device sends a synchronization signal block or there is a candidate sending time location of a synchronization signal block, that the scheme of performing paging or broadcast message transmission is the first scheme; or determining, if it is determined, within the time range within which the network device performs paging or broadcast message transmission to the terminal device, that the network device sends no synchronization signal block or there is no candidate sending time location of a synchronization signal block, that the scheme of performing paging or broadcast message transmission is the second scheme.

With reference to the second aspect or the foregoing any possible implementation, in another possible implementation of the second aspect, the monitoring, by the terminal device at the specific frequency point according to the determined scheme, paging performed by the network device or the broadcast message transmitted by the network device to the terminal device includes:

determining, when the determined scheme is the first scheme, at least one of a time length in which the network device an actually transmitted synchronization signal block at the specific frequency point, at least some symbols in a time location, a subcarrier spacing, and a spacing between time locations, as at least one of a time length used by the network device to perform paging or broadcast message transmission to the terminal device at the specific frequency point, at least some symbols in a time location, a subcarrier spacing, and a spacing between time locations; and monitoring, by the terminal device at the specific frequency point according to the determined time length, time location, and/or subcarrier spacing, paging performed by the network device or the broadcast message transmitted by the network device to the terminal device.

With reference to the second aspect or the foregoing any possible implementation, in another possible implementation of the second aspect, the monitoring, by the terminal device at the specific frequency point according to the determined scheme, paging performed by the network device or the broadcast message transmitted by the network device to the terminal device includes:

when the determined scheme is the second scheme, monitoring, on N consecutive time locations at the specific frequency point, paging performed by the network device or the broadcast message transmitted by the network device to the terminal device.

With reference to the second aspect or the foregoing any possible implementation, in another possible implementation of the second aspect, the N time locations occupy Q slots, and a start point of the N time locations is an $M^{th}$ symbol of a first slot of the Q slots, where Q is an integer greater than or equal to 1, and M is an integer greater than or equal to 1.

With reference to the second aspect or the foregoing any possible implementation, in another possible implementation of the second aspect, the monitoring, by the terminal device at the specific frequency point according to the determined scheme, paging performed by the network device or the broadcast message transmitted by the network device to the terminal device includes:

when the determined scheme is the second scheme, monitoring, by the terminal device on N time locations, paging performed by the network device or the broadcast message transmitted by the network device to the terminal device, where the N time locations have at least two neighboring time locations that are inconsecutive.

With reference to the second aspect or the foregoing any possible implementation, in another possible implementation of the second aspect, the N time locations occupy R slots, and each slot includes T time locations, where R is an integer greater than or equal to 1, and T is an integer greater than or equal to 1.

With reference to the second aspect or the foregoing any possible implementation, in another possible implementation of the second aspect, in the each slot, a start point of the T time locations is an $S^{th}$ symbol of the each slot, where S is an integer greater than or equal to 1.

With reference to the second aspect or the foregoing any possible implementation, in another possible implementation of the second aspect, in the each slot, an end point of the T time locations is a last but P−1 symbol of the each slot, where P is an integer greater than or equal to 1.

With reference to the second aspect or the foregoing any possible implementation, in another possible implementation of the second aspect, when T is greater than 1, any two time locations of the T time locations are inconsecutive.

With reference to the second aspect or the foregoing any possible implementation, in another possible implementation of the second aspect, when T is greater than 1, the T time locations have at least two consecutive time locations.

With reference to the second aspect or the foregoing any possible implementation, in another possible implementation of the second aspect, the at least two consecutive time locations and at least two consecutive time locations adjacent to the at least two consecutive time locations are spaced apart by at least one symbol.

A third aspect provides a network device, configured to perform the method in the foregoing first aspect or any possible implementation of the first aspect. Specifically, the network device includes functional modules configured to perform the method in the foregoing first aspect or any possible implementation of the first aspect.

A fourth aspect provides a terminal device, configured to perform the method in the foregoing second aspect or any possible implementation of the second aspect. Specifically, the terminal device includes functional modules configured to perform the method in the foregoing second aspect or any possible implementation of the second aspect.

A fifth aspect provides a network device, including a processor, a memory, and a transceiver. The processor, the memory, and the transceiver communicate with each other through an internal connection path, to transfer a control signal and/or a data signal, to enable the network device to perform the method in the first aspect or any possible implementation of the first aspect.

A sixth aspect provides a terminal device, including a processor, a memory, and a transceiver. The processor, the memory, and the transceiver communicate with each other through an internal connection path, to transfer a control signal and/or a data signal, to enable the terminal device to perform the method in the second aspect or any possible implementation of the second aspect.

A seventh aspect provides a computer readable medium, configured to store a computer program, where the computer program includes an instruction used to perform the method in any one of the foregoing aspects or any possible implementation.

An eighth aspect provides a computer program product including an instruction, and when the computer program product is run on a computer, the computer is enabled to perform the method in any one of the foregoing aspects or any possible implementation.

BRIEF DESCRIPTION OF THE DRAWINGS

To describe the technical solutions in the embodiments of this application more clearly, the following briefly introduces the accompanying drawings for describing the embodiments or the prior art. Apparently, the accompanying drawings in the following description show merely some embodiments of this application, and a person of ordinary skill in the art may still derive other drawings from the accompanying drawings without creative efforts.

DETAILED DESCRIPTION

The following describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

The technical solutions of the embodiments of this application may be applied to various communications systems, such as: a Global System for Mobile Communications ("GSM" for short), a Code Division Multiple Access ("CDMA" for short) system, a Wideband Code Division Multiple Access ("WCDMA" for short), a General Packet Radio Service ("GPRS" for short), a Long Term Evolution ("LTE" for short) system, an LTE Frequency Division Duplex ("FDD" for short) system, an LTE Time Division Duplex ("TDD" for short) system, a Universal Mobile Telecommunications System ("UMTS" for short) system, a Worldwide Interoperability for Microwave Access ("WiMAX" for short) communications system, and a future 5G communications system.

Figure 1:
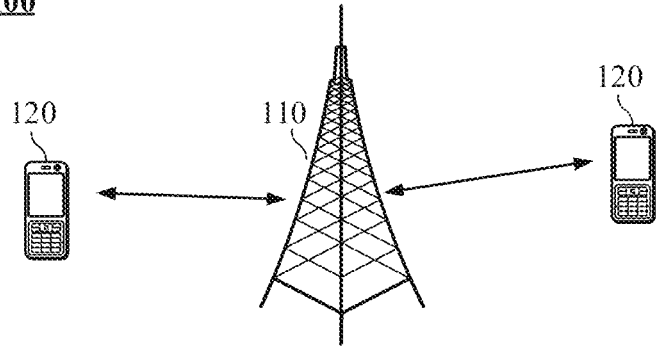
FIG. 1 is a schematic diagram of a wireless communications system according to an embodiment of this application.

FIG. 1 shows a wireless communications system 100 to which an embodiment of this application is applied. The wireless communications system 100 may include a network device 110. The network device 100 may be a device communicating with a terminal device. The network device 100 may provide communications coverage to a particular geographic area, and may communicate with a terminal device (for example, UE) located within the coverage area. Optionally, the network device 100 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved public land mobile network (PLMN) or the like.

The wireless communications system 100 further includes at least one terminal device 120 located within the coverage range of the network device 110. The terminal device 120 may be mobile or fixed. Optionally, the terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

Optionally, the terminal devices 120 may perform device to device (D2D) communication with each other.

Optionally, the 5G system or network may be further referred to as a new radio (NR) system or network.

FIG. 1 shows one network device and two terminal devices as an example. Optionally, the wireless communications system 100 may include a plurality of network devices and coverage of each network device may include another quantity of terminal devices. This is not limited in this embodiment of this application.

Optionally, the wireless communications system 100 may further include other network entities such as a network controller and a mobility management entity. This is not limited in this embodiment of this application.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 2:
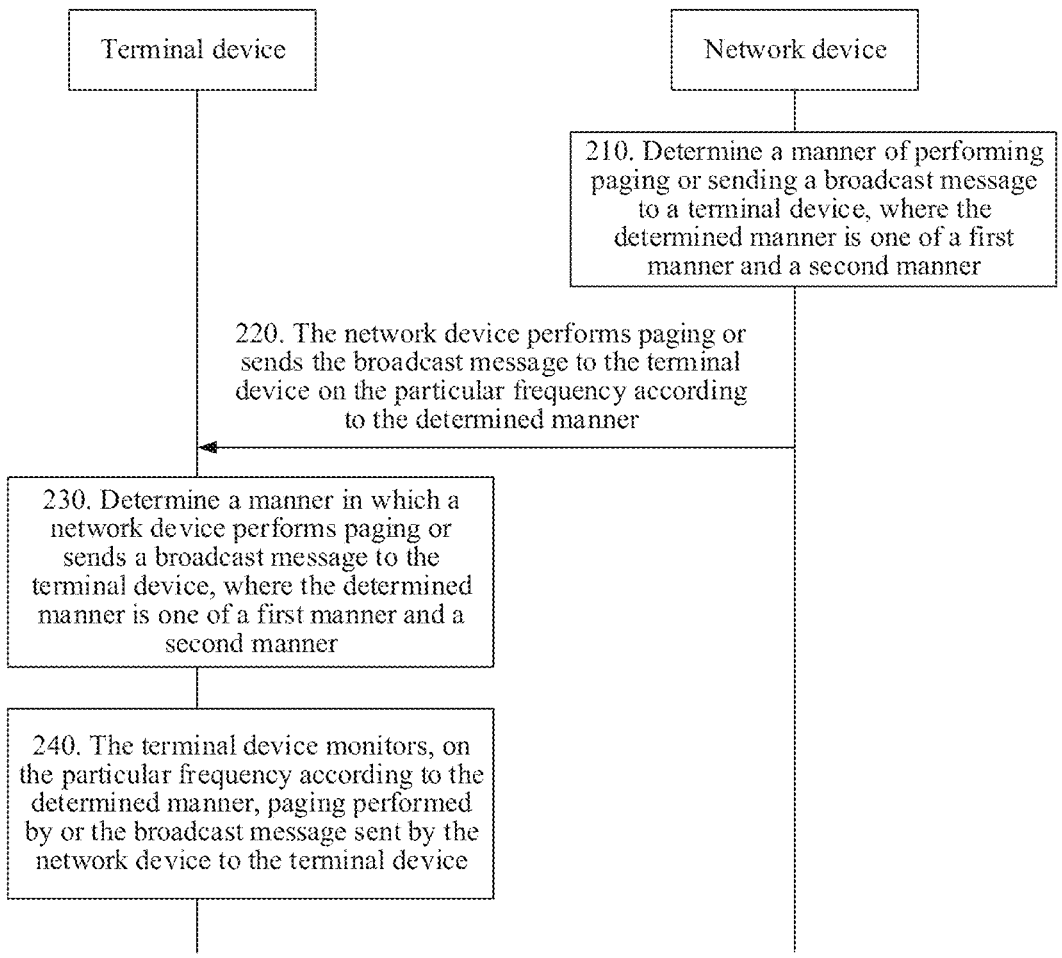
FIG. 2 is a schematic flowchart of a wireless communication method according to an embodiment of this application.

FIG. 2 is a schematic flowchart of a wireless communication method 200 according to an embodiment of this application. The method 200 may be optionally applied to the system shown in FIG. 1, but is not limited thereto. The method 200 includes at least a part of the following content.

In 210, a network device determines a scheme of performing paging or broadcast message transmission to a terminal device, where the determined scheme is one of a first scheme and a second scheme, where in the first scheme, a first parameter set is used for performing paging or broadcast message transmission at a specific frequency point, and in the second scheme, a second parameter set is used for performing paging or broadcast message transmission at a specific frequency point.

Specifically, the network device may select one scheme from the first scheme and the second scheme as the scheme of performing paging or broadcast message transmission to the terminal device, where the selecting a scheme of performing paging or broadcast message transmission aims to determine a parameter set used for performing paging or broadcast message transmission to the terminal device, and the network device may perform paging or broadcast message transmission to the terminal device according to the parameter set corresponding to the selected scheme.

Optionally, types of parameters included in the first parameter set corresponding to the first scheme and the second parameter set corresponding to the second scheme may be the same, but values of at least one type of parameters may be different. Specifically, values of at least one of a time location, a time length, a subcarrier spacing, and a spacing between time locations may be different.

For example, a length of a time location corresponding to the first parameter set and a length of a time location corresponding to the second parameter set are different, the length of the time location corresponding to the first parameter set is four symbols, and the length of the time location corresponding to the second parameter set is two symbols.

For example, a quantity of time locations corresponding to the first parameter set and a quantity of time locations corresponding to the second parameter set are different, the quantity of time locations corresponding to the first parameter set is two, and the quantity of time locations corresponding to the second parameter set is four.

For example, a subcarrier spacing corresponding to the first parameter set and a subcarrier spacing corresponding to the second parameter set are different, the subcarrier spacing corresponding to the first parameter set is 30 KHz, and the subcarrier spacing corresponding to the second parameter set is 15 KHz.

Alternatively, types of parameters included in the first parameter set corresponding to the first scheme and the second parameter set corresponding to the second scheme may be the same, and values of the parameters are also the same.

Optionally, the first parameter set and the second parameter set respectively includes at least one of a time location that needs to be occupied for performing paging or broadcast message transmission, a time length for performing paging or broadcast message transmission, a subcarrier spacing for performing paging or broadcast message transmission, and a spacing between time locations.

Optionally, the time location mentioned in this embodiment of this application may include at least one symbol, and when the time location includes a plurality of symbols, the plurality of symbols may be consecutive.

Optionally, each time location corresponds to single beam scanning, and different time locations of performing paging or broadcast message transmission once may correspond to different beams.

Optionally, that the network device performs paging to the terminal device may mean that a physical downlink control channel (PDCCH) and/or a physical downlink shared channel (PDSCH) used for paging is sent on a corresponding time location.

Optionally, the broadcast message mentioned in this embodiment of this application may be a message carrying RMSI, OSI, or on-demand system information.

Optionally, when paging is performed, one time location mentioned in this embodiment of this application may be used for carrying a PDSCH and a PDCCH that perform frequency division multiplexing; different symbols of one time location are respectively used for carrying a PDSCH and a PDCCH; one time location is used for carrying only a PDCCH or a PDSCH; or a PDSCH occupies a plurality of symbols of one time location, and a PDCCH performs frequency division multiplexing with the PDSCH on at least some symbols of the plurality of symbols.

Optionally, the time length mentioned in this embodiment of this application may be represented through a quantity of symbols, and the time length mentioned this application may be a time length occupied by single beam scanning, or may be a time length occupied by one time of complete beam scanning (which includes a plurality of beams).

Optionally, the spacing between time locations mentioned in this embodiment of this application may be a spacing between center symbols of two time locations, or may a spacing between first symbols of two time locations, a spacing between last symbols of two time locations, or a spacing between a last symbol of a former time location and a first symbol of a latter time location.

Optionally, corresponding to one downlink beam (or one time location), a time length of performing paging or broadcast message transmission may be two, four, or seven symbols, or duration corresponding to one slot.

Optionally, the first parameter set and the second parameter set may have different values for at least one of a time location, a time length, a subcarrier spacing, and a spacing between time locations.

It should be understood that, the first parameter set and the second parameter set may further include a parameter other than at least one of a time location, a time length, a subcarrier spacing, and a spacing between time locations, and this is not specifically limited in this embodiment of this application.

Optionally, the specific frequency point mentioned in this embodiment of this application may be a frequency of communicating with the terminal device.

Optionally, in this embodiment of this application, for different frequencies, parameter values of the first parameter set and/or the second parameter set may be different.

Optionally, the first parameter set refers to a parameter set used for an actually transmitted synchronization signal block.

Optionally, the second parameter set does not refer to a parameter set used for an actually transmitted synchronization signal block.

It should be understood that, although the second parameter set does not refer to the parameter set used for an actually transmitted synchronization signal block, it does not mean that parameter values of the second parameter set and the first parameter set are necessarily different. That the second parameter set does not refer to the parameter set used for an actually transmitted synchronization signal block means only that when the second parameter set is obtained or the second parameter set is preset, the network device or the terminal device does not consider such a factor of sending of a synchronization signal block, but may consider another factor, to coincidentally make parameter values of the first parameter set be the same as parameter values of the second parameter set.

For ease of understanding, sending of a synchronization signal block is described in detail below.

A synchronization signal block (SS Block or SSB) is transmitted in cycles. Within an SS block cycle, an SS burst set at a specific frequency point may be limited to being within a time window of 5 ms, and a maximum quantity of SS blocks is L, where
within a frequency domain range less than 3 GHz, L=4;
within a frequency domain range from 3 GHz to 6 GHz, L=8; and
within a frequency domain range from 6 GHz to 52.6 GHz, L=64.

Within the time window of 5 ms, for different subcarrier spacings and different operating frequency bands, slot distribution of an SS block may be shown in FIG. 2.

Figure 3:
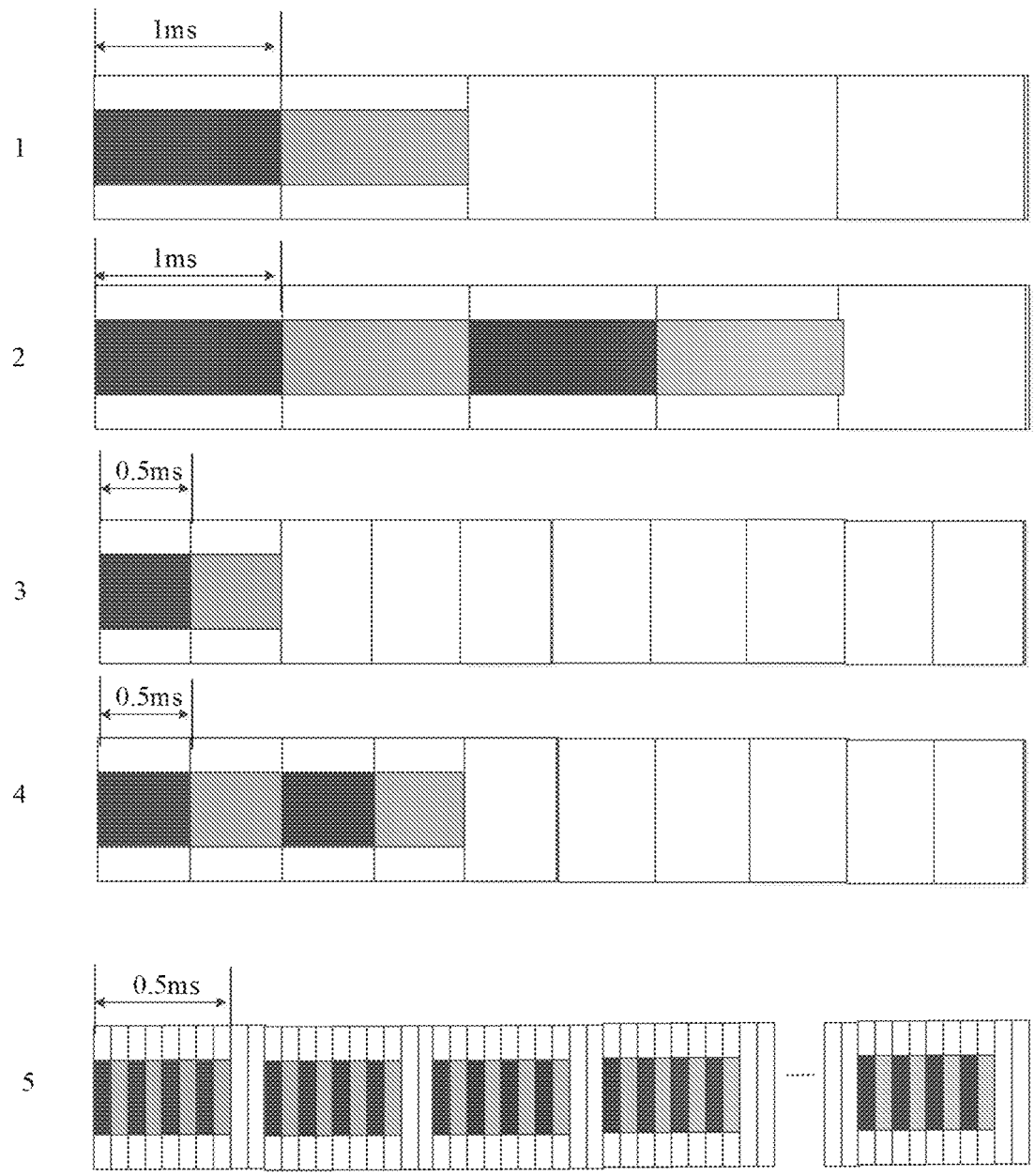
FIG. 3 is a slot distribution diagram of a synchronization signal block according to an embodiment of this application.

The first row in FIG. 3 shows slot distribution of an SS Block when a subcarrier spacing is 15 KHz and L=4. The second row in FIG. 3 shows slot distribution of an SS Block when a subcarrier spacing is 15 KHz and L=8. The third row in FIG. 3 shows slot distribution of an SS Block when a subcarrier spacing is 30 KHz and L=4. The fourth row in FIG. 3 shows slot distribution of an SS Block when a subcarrier spacing is 30 KHz and L=8. The fifth row in FIG. 3 shows slot distribution of an SS Block when a subcarrier spacing is 240 KHz and L=64.

Figure 4:
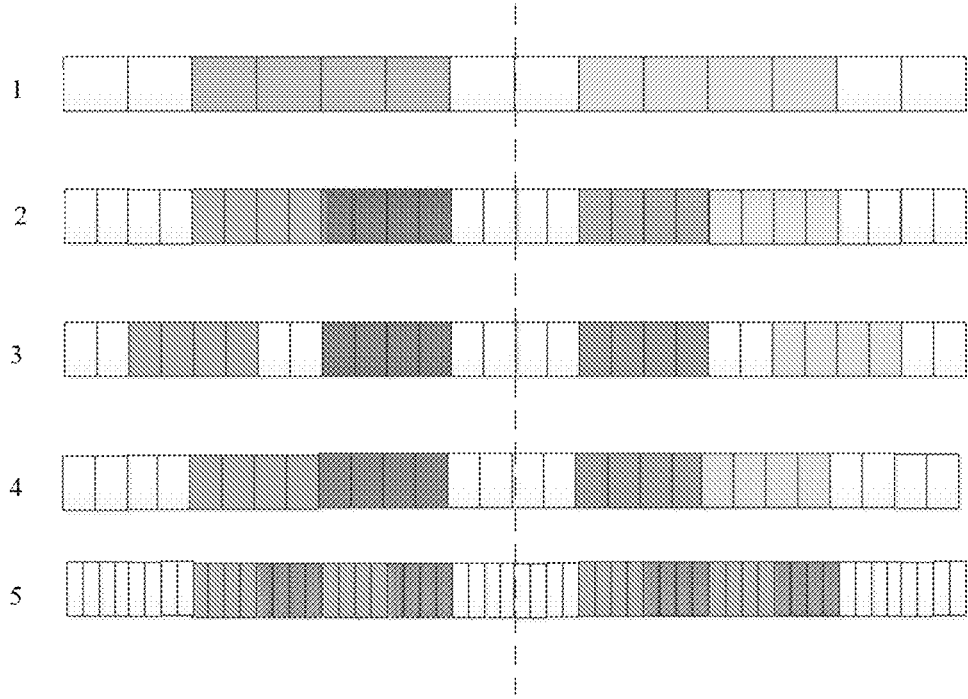
FIG. 4 is a distribution diagram of a synchronization signal block in a slot according to an embodiment of this application.

FIG. 4 shows distribution of patterns within a slot on 15 KHz, 30 KHz, 120 KHz, and 240 KHz.

As shown in FIG. 4, in a case of 15 KHz and 30 KHz, at least one or two symbols used for downlink control are reserved at the beginning of 14 symbols, and at least two symbols used for, for example, a guard interval or uplink control are reserved at the end of the 14 symbols.

In a case of 120 KHz, at least two symbols used for downlink control are reserved at the beginning of 14 symbols, and at least two symbols used for, for example, a guard interval or uplink control are reserved at the end of the 14 symbols.

In a case of 240 KHz, two consecutive slots are crossed, at least four symbols used for downlink control are reserved at the beginning of the first slot, and at least four symbols used for, for example, a guard interval or uplink control are reserved at the end of the second slot.

Optionally, before the network device determines the scheme of performing paging to the terminal device, the network device determines a paging occasion of performing paging to the terminal device; and the network device determines a scheme of performing paging to the terminal device on the paging occasion.

Optionally, the paging occasion mentioned in this embodiment of this application may be used for sending a PDSCH and/or a PDCCH.

If the paging occasion is used for sending the PDSCH and the PDCCH, the PDSCH and the PDCCH may be sent on a same time location (occupying a same symbol). In this case, the PDSCH and the PDCCH may perform frequency division multiplexing.

Alternatively, if the paging occasion is used for sending the PDSCH and the PDCCH, the PDSCH and the PDCCH may be sent on different time locations. For example, the PDCCH may be first sent through a plurality of beams, and then the PDSCH is sent through a plurality of beams. For example, the PDCCH and the PDSCH may be sent once on different symbols respectively through a same beam or different beams, and then the PDCCH and the PDSCH are sent once again on other different symbols respectively through a same beam or different beams. The rest can be deduced by analogy.

Optionally, when the terminal device is monitoring paging, the terminal device may attempt to receive a paging message in a particular subframe (referred to as a PO) of a particular frame (referred to as a PF) within a paging cycle thereof. The paging occasion (PO) may be a subframe. In the subframe, there may be a PDCCH that is scrambled by using a paging radio network temporary identifier (P-RNTI) and indicates the paging message. When discontinuous reception (DRX) is used, the terminal device may need to detect only one PO on each DRX cycle. That is, corresponding to each terminal device, only one subframe within each paging cycle may be used for sending paging. The DRX cycle may be the same as the paging cycle. A paging frame (PF) may be a radio frame, and the frame may include one or more POs.

It should be understood that, the paging occasion introduced above is only a specific implementation of this application, and for ease of understanding this application, should not constitute a particular limitation on the scope of this application.

In 220, the network device performs paging or broadcast message transmission to the terminal device at the specific frequency point according to the determined scheme.

In 230, the terminal device determines a scheme in which a network device performs paging or broadcast message transmission to the terminal device, where the determined scheme is one of a first scheme and a second scheme.

Optionally, the terminal device determines a paging occasion on which the network device performs paging to the terminal device; and the terminal device determines a scheme in which the network device performs paging to the terminal device on the paging occasion.

In 240, the terminal device monitors, at the specific frequency point according to the determined scheme, paging performed by the network device or the broadcast message transmitted by the network device to the terminal device.

Optionally, the terminal device monitors, on the corresponding time location according to the determined scheme, to a PDCCH and/or a PDSCH used for paging or broadcast message transmission.

Optionally, the network device sends first information to the terminal device, where the first information is used to notify a scheme of performing paging or broadcast message transmission or notify the first parameter set and/or the second parameter set.

Correspondingly, the terminal device may receive the first information sent by the network device, and based on the first information, the terminal device may obtain a scheme of performing paging or broadcast message transmission to the terminal device by the network device, or obtain the first parameter set and/or the second parameter set.

Optionally, the first information is carried in remaining minimum system information (RMSI), other system information (OSI), on-demand system information, or a radio resource control (RRC) message.

For example, when being used for paging, the first information may be carried in remaining minimum system information (RMSI), other system information (OSI), on-demand system information, or a radio resource control (RRC) message.

When being used for broadcast message transmission, the first information may be carried in remaining minimum system information (RMSI), other system information (OSI), or on-demand system information.

Optionally, the network device determines, according to a paging occasion of currently performing paging or a time period in which the broadcast message is transmitted, the scheme of performing paging or broadcast message transmission to the terminal device. Correspondingly, the terminal device may alternatively determine, according to a time period in which the network device currently performs paging or broadcast message transmission to the terminal device, a scheme in which the network device performs paging or broadcast message transmission to the terminal device.

Specifically, the scheme of performing paging or broadcast message transmission is related to the paging occasion or the time period in which a broadcast message is transmitted. For example, the first scheme may be used in a first time period, then the second scheme is used in a second time period adjacent to the first time period, and the first scheme is used in a subsequent third time period.

Optionally, the network device sends second information to the terminal device, where the second information is used to notify an association relationship between the scheme of performing paging or broadcast message transmission and the time period. Therefore, the terminal device may obtain, according to the second information sent by the network device, an association relationship between the scheme of performing paging or broadcast message transmission to the terminal device by the network device and the time period.

Optionally, the second information is carried in remaining minimum system information RMSI, other system information OSI, on-demand system information, or a radio resource control RRC message.

For example, when being used for paging, the second information may be carried in remaining minimum system information (RMSI), other system information (OSI), on-demand system information, or a radio resource control (RRC) message.

When being used for broadcast message transmission, the second information may be carried in remaining minimum system information (RMSI), other system information (OSI), or on-demand system information.

Optionally, the association relationship between the scheme of performing paging or broadcast message transmission to the terminal device by the network device and the time period may be preset on each of the network device and the terminal device, and therefore the network device does not need to send the second information to notify the association relationship to the terminal device.

Optionally, the network device or the terminal device may determine, according to whether a synchronization signal block is sent or there is a candidate sending time location of a synchronization signal block within a time range of performing paging or broadcast message transmission, a scheme of performing paging or broadcast message transmission.

The network device or the terminal device determines, if a synchronization signal block is sent or there is a candidate sending time location of a synchronization signal block within the time range of performing paging or broadcast message transmission, that the scheme of performing paging or broadcast message transmission is the first scheme; or determines, if no synchronization signal block is sent or there is no candidate sending time location of a synchronization signal block within the time range of performing paging or broadcast message transmission, that the scheme of performing paging or broadcast message transmission is the second scheme.

The terminal device may determine, according to whether the synchronization signal block is actually detected or according to a notification message of the network device, whether the network device sends the synchronization signal block within a time range of performing paging or broadcast message transmission to the terminal device by the network device.

Optionally, the network device determines, when the determined scheme is the first scheme, at least one of a time length of an actually transmitted synchronization signal block at the specific frequency point, at least some symbols in a time location, a subcarrier spacing, and a spacing between time locations, as at least one of a time length required for performing paging or broadcast message transmission at the specific frequency point, at least some symbols in a time location, a subcarrier spacing, and a spacing between time locations; and performs paging or broadcast message transmission to the terminal device at the specific frequency point according to the determined at least one of the time length, the time location, the subcarrier spacing, and the spacing between the time locations.

The network device may perform paging or broadcast message transmission to the terminal device at the specific frequency point by using a beam parameter setting the same as that for sending a synchronization signal block.

If the SSB and the paging or broadcast message multiplex a beam, no additional beam scanning cycle is required; or if the SSB and the paging or broadcast message multiplex no beam, an independent time length, time location, subcarrier spacing, or the like is used, thereby better matching load of performing paging or broadcast message transmission.

Certainly, the network device may alternatively perform paging or broadcast message transmission to the terminal device by using a beam parameter setting different from that for sending a synchronization signal block.

Correspondingly, the terminal device determines, when the determined scheme is the first scheme, at least one of a time length in which the network device actually sends a synchronization signal block at the specific frequency point, at least some symbols in a time location, a subcarrier spacing, and a spacing between time locations, as at least one of a time length used by the network device to perform paging or broadcast message transmission to the terminal device at the specific frequency point, at least some symbols in a time location, a subcarrier spacing, and a spacing between time locations; and the terminal device monitors, at the specific frequency point according to the determined time length, time location, subcarrier spacing and/or spacing between time locations, paging performed by the network device or the broadcast message transmitted by the network device to the terminal device.

Description is made below by using an example in which the subcarrier spacing is 15 KHz and L=4.

Figure 5:
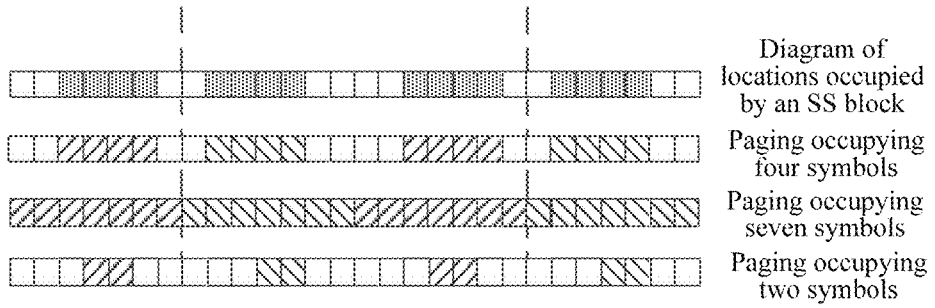
FIG. 5 is a schematic diagram of a relationship between a candidate location of a synchronization signal block and a possible location of paging or a broadcast message according to an embodiment of this application.

Specifically, a location of performing paging or broadcast message transmission refers to a candidate location on which L is equal to a maximum of four SSBs, and corresponding to each candidate location, a possible symbol location occupied by a paging message of two symbols, four symbols, or seven symbols is shown in FIG. 5.

Figure 6:
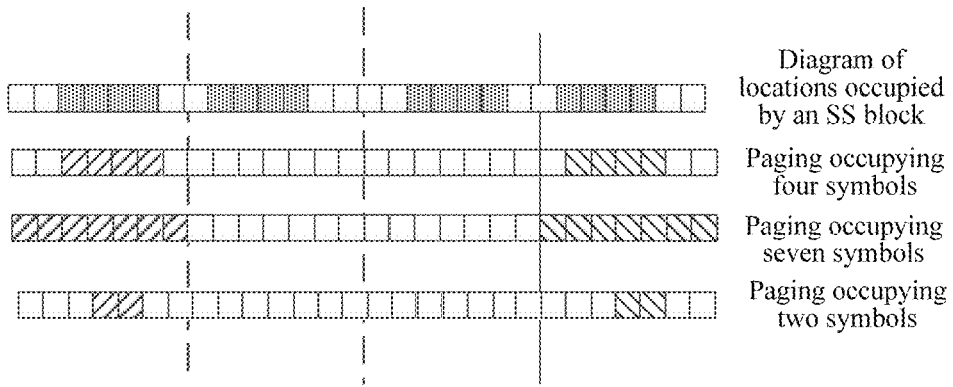
FIG. 6 is a schematic diagram of a relationship between an actual sending location of a synchronization signal block and an actual occupation location of paging or a broadcast message according to an embodiment of this application.

If a corresponding SSB is transmitted, a paging message or a broadcast message corresponding to the SSB is also correspondingly transmitted. Otherwise, if an SSB on a location is actually not transmitted, a paging message or a broadcast message is correspondingly not transmitted on the location either. For example, as shown in FIG. 6, SSBs on the first location and the fourth location are transmitted, and therefore paging is performed or a broadcast message is transmitted to the terminal on the first location and the fourth location as well.

Optionally, when a quantity of symbols occupied by one actual sending location or candidate sending location of a synchronization signal block is L times a quantity of symbols occupied by one time location of a broadcast message or a paging message, the symbols occupied by the time location of the broadcast message or the paging message all belong to the symbols occupied by the actual sending location or the candidate sending location of the synchronization signal block, where L is an integer is greater than or equal to 1.

In this implementation, the network device may indicate actual sending locations or candidate locations of a synchronization signal block that are used for simultaneously performing paging or broadcast message transmission. The indication may be performed in a bit mapping scheme. Assuming that a quantity of actual sending locations or candidate locations of the synchronization signal block is also N, symbols that may be used for performing paging or broadcast message transmission may be indicated by using N*L bits.

Figure 7:
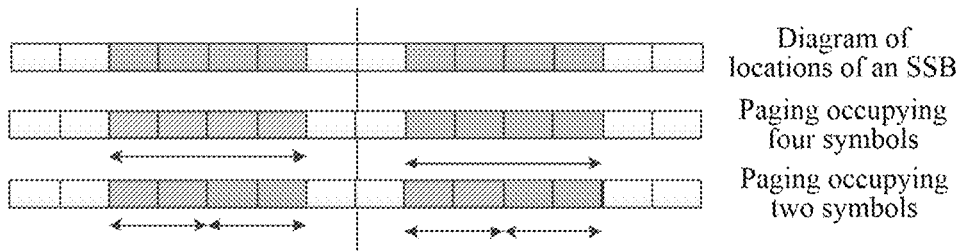
FIG. 7 is a schematic diagram of a relationship between an actual sending location of a synchronization signal block and an actual occupation location of paging or a broadcast message according to an embodiment of this application.

Additionally, as shown in FIG. 7, on each available candidate location of an SSB, there are four symbols available for the SSB, and therefore when a paging message or a broadcast message is transmitted by using four symbols, four symbols on an SSB location in an SSB distribution pattern within one slot may be multiplexed. When a paging message or a broadcast message is transmitted by using two symbols, a group of four available symbols in the pattern may be multiplexed in two times of transmission of the paging message.

FIG. 5 to FIG. 7 mainly show cases in which two symbols, four symbols, and seven symbols are occupied to perform paging or broadcast message transmission, but in this embodiment of this application, another quantity of symbols such as five symbols or six symbols may be further occupied to perform paging or broadcast message transmission.

Optionally, for an SSB pattern of 30 KHz, 120 KHz, or 240 KHz, being limited to the SSB pattern, symbols on neighboring SSB candidate locations are consecutive. Consequently, a maximum of four symbols may be used for paging transmission or broadcast message transmission; and preferentially, a quantity of symbols for paging transmission or broadcast message transmission is four.

Optionally, in a beam corresponding to each SS block, transmission duration for paging or broadcast message transmission is two, four, or seven symbols, or duration corresponding to one slot. Preferably, when the transmission duration for paging or broadcast message transmission is two or four symbols, paging or a broadcast message is transmitted within a symbol occupied by the SS block; and frequency division multiplexing is performed for the paging or the broadcast message and the SS block.

Optionally, duration of performing paging or broadcast message transmission on all SS blocks is the same.

How to perform paging or broadcast message transmission to the terminal device when the determined scheme is the first scheme has been introduced above, and how to perform paging or broadcast message transmission to the terminal device when the determined scheme is the second scheme is to be introduced below.

In an implementation, when the determined scheme is the second scheme, paging is performed or a broadcast message is transmitted on N consecutive time locations at the specific frequency point.

Figure 8:
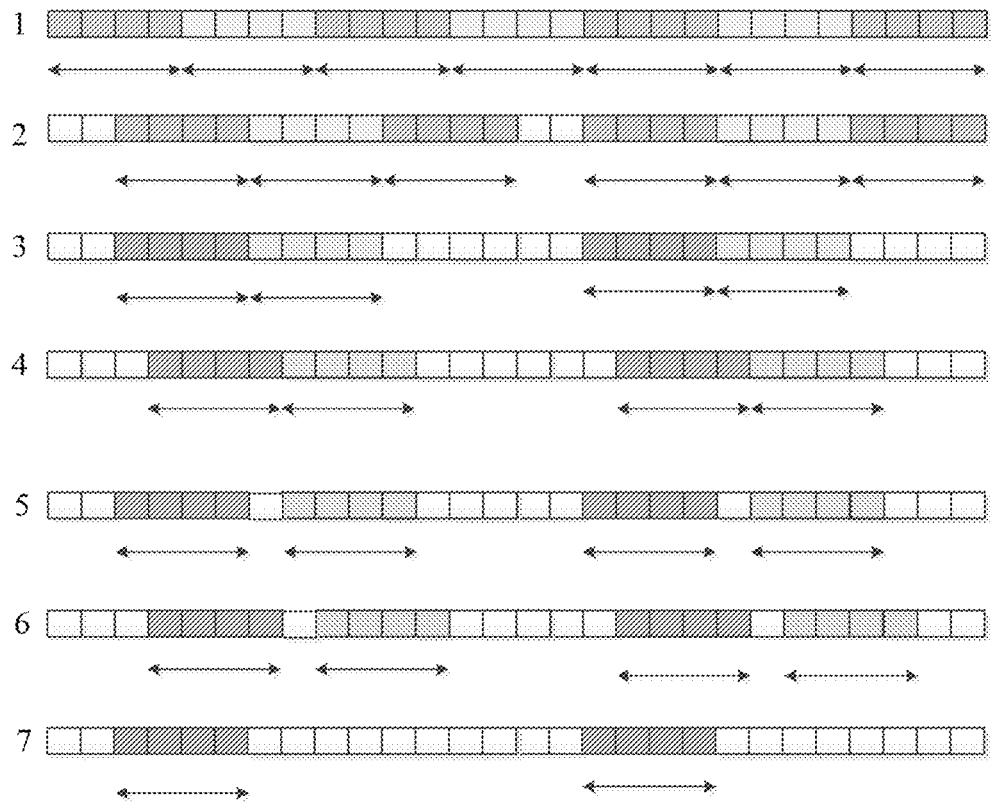
FIG. 8 is a schematic diagram of a time location used for paging or broadcast message transmission according to an embodiment of this application.

Optionally, the N time locations occupy Q slots, and a start point of the N time locations is an $M^{th}$ symbol of a first slot of the Q slots, where Q is an integer greater than or equal to 1, and M is an integer greater than or equal to 1. For example, this is shown in the first row in FIG. 8.

For example, for paging, from a determined time start point, consecutive arrangement is performed according to duration of paging messages, until paging messages corresponding to all SSBs are sent completely. The determined time start point may be a start point (that is, the first symbol) of a slot of a PO, or may be an offset start symbol location in a slot within Poslot; and the start point may be predetermined by the network and the terminal, or be notified by the network to the terminal.

In another implementation, when the determined scheme is the second scheme, paging is performed or a broadcast message is transmitted on N time locations, where the N time locations have at least two neighboring time locations that are inconsecutive. For example, this is shown in the second to seventh rows in FIG. 8.

Optionally, the N time locations occupy R slots, and each slot includes T time locations, where R is an integer greater than or equal to 1, and T is an integer greater than or equal to 1.

Optionally, in the each slot, a start point of the T time locations is an $S^{th}$ symbol of the each slot, where S is an integer greater than or equal to 1. For example, this is shown in the second to seventh rows in FIG. 8, where S is greater than 1.

Optionally, in the each slot, an end point of the T time locations is a last but P−1 symbol of the each slot, where P is an integer greater than or equal to 1. This is shown in the third to seventh rows in FIG. 8, where P is greater than 1.

Optionally, when T is greater than 1, any two time locations of the T time locations are inconsecutive. This is shown in the fifth and sixth rows in FIG. 8.

For example, using paging as an example, from the determined time start point of the PO, K times of paging message transmission that are discontinuously arranged are performed starting from an $M^{th}$ symbol in each slot within the PO according to duration of a paging message, and two neighboring times of paging message transmission may be spaced apart by N symbols, until paging corresponding to all actually transmitted SSBs is sent completely. M may be 1, 2, or 3, N may be 1, 2, or 3, and K=1 to 3.

Optionally, when T is greater than 1, the T time locations have at least two consecutive time locations. For example, this is shown in the second to fourth rows in FIG. 8.

For example, using paging as an example, from the determined time start point of the PO, K times of paging message transmission that are continuously arranged are performed starting from an $M^{th}$ symbol in each slot within the PO according to duration of a paging message, until paging corresponding to all actually transmitted SSBs is sent completely. M may be 1, 2, or 3, and K=1 to 3.

Optionally, in a same slot, the at least two consecutive time locations and at least two consecutive time locations adjacent to the at least two consecutive time locations are spaced apart by at least one symbol. For example, this is shown in the second to fourth rows in FIG. 8.

It should be understood that, the description made by using an example in which the first parameter set refers to a parameter set used for an actually transmitted synchronization signal block and the second parameter set does not refer to a parameter set used for an actually transmitted synchronization signal block has been introduced above. However, this embodiment of this application is not limited thereto, and both the first parameter set and the second parameter set refer to a parameter set used for an actually transmitted synchronization signal block.

For example, for a parameter, both the first parameter set and the second parameter set refer to a parameter used for different actually transmitted signal blocks, but values for the parameter are different. For example, the time length of actually sending a synchronization signal block is four symbols, and lengths of time locations corresponding to the first parameter set and the second parameter set are both less than or equal to four symbols, where the length of the time location corresponding to the first parameter set is two symbols, and the length of the time location corresponding to the second parameter set is four symbols.

For example, the first parameter set and the second parameter set respectively refer to different parameters for an actually transmitted synchronization signal block. For example, the first parameter set refers to a subcarrier spacing for an actually synchronization signal block, and the second parameter set refers to a length of a time location for an actually transmitted synchronization signal block.

Therefore, in this embodiment of this application, the first scheme corresponding to the first parameter set and the second scheme corresponding to the second parameter set may be used by the network device to perform paging or broadcast message transmission, and flexibility of performing paging or broadcast message transmission to the terminal device by the network device may be enhanced.

Figure 9:
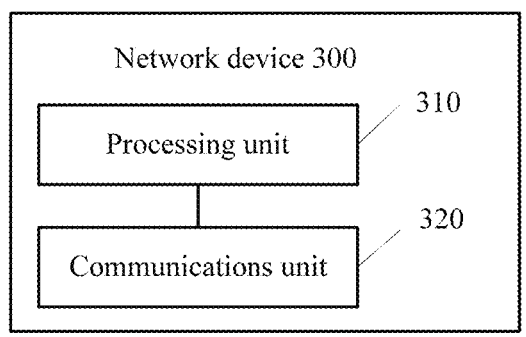
FIG. 9 is a schematic block diagram of a network device according to an embodiment of this application.

FIG. 9 is a schematic block diagram of a network device 300 according to an embodiment of this application. As shown in FIG. 9, the network device 300 includes a processing unit 310 and a communications unit 320.

The processing unit 310 is configured to determine a scheme of performing paging or broadcast message transmission to a terminal device, where the determined scheme is one of a first scheme and a second scheme, where
    in the first scheme, a first parameter set is used for performing paging or broadcast message transmission at a specific frequency point, and in the second scheme, a second parameter set is used for performing paging or broadcast message transmission at a specific frequency point; and
    the communications unit 320 is configured to perform paging or broadcast message transmission to the terminal device at the specific frequency point according to the determined scheme.

It should be understood that, the network device 300 may correspond to the network device in the method embodiment, and may implement corresponding operations implemented by the network device in the method embodiment. For brevity, details are not described herein again.

Figure 10:
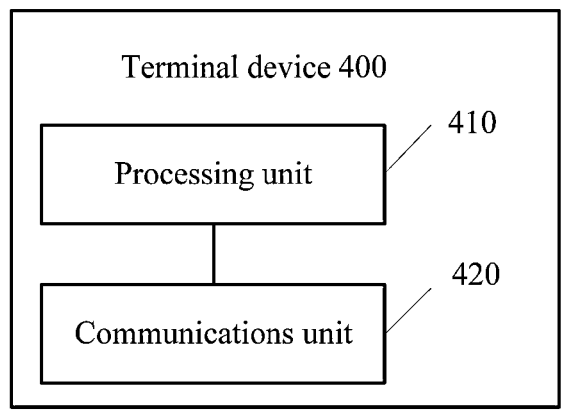
FIG. 10 is a schematic block diagram of a terminal device according to an embodiment of this application.

FIG. 10 is a schematic block diagram of a terminal device 400 according to an embodiment of this application. As shown in FIG. 10, the terminal device 400 includes a processing unit 410 and a communications unit 420.

The processing unit 410 is configured to: determine a scheme in which a network device performs paging or broadcast message transmission to the terminal device, where the determined scheme is one of a first scheme and a second scheme, where
    in the first scheme, a first parameter set is used for performing paging or broadcast message transmission at a specific frequency point, and in the second scheme, a second parameter set is used for performing paging or broadcast message transmission at a specific frequency point; and
    the communications unit 420 is configured to: monitor, at the specific frequency point according to the determined scheme, paging performed by the network device or the broadcast message transmitted by the network device to the terminal device.

It should be understood that, the terminal device 400 may correspond to the terminal device in the method embodiment, and may implement corresponding operations implemented by the terminal device in the method embodiment. For brevity, details are not described herein again.

Figure 11:
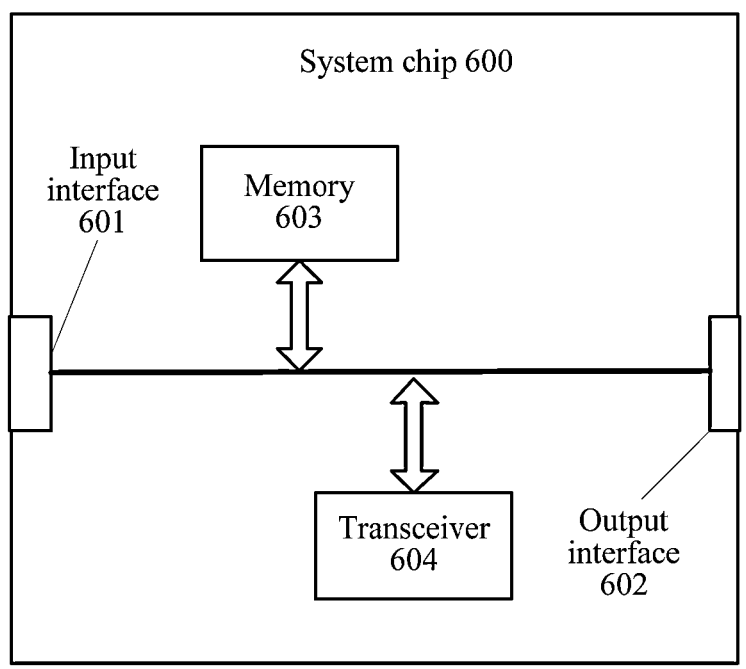
FIG. 11 is a schematic block diagram of a system chip according to an embodiment of this application.

FIG. 11 is a schematic structural diagram of a system chip 600 according to an embodiment of this application. The system chip 600 in FIG. 11 includes an input interface 601, an output interface 602, a processor 603 and a memory 604 that may be connected to each other by using an internal communications connection line, and the processor 603 is configured to execute code in the memory 604.

Optionally, when the code is executed, the processor 603 implements the method performed by the network device in the method embodiment. For brevity, details are not described herein again.

Optionally, when the code is executed, the processor 603 implements the method performed by the terminal device in the method embodiment. For brevity, details are not described herein again.

Figure 12:
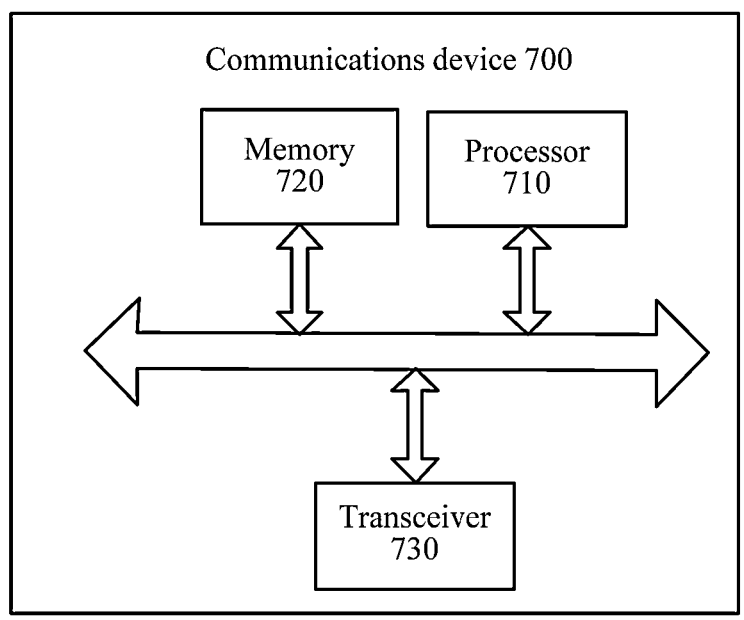
FIG. 12 is a schematic block diagram of a communications device according to an embodiment of this application.

FIG. 12 is a schematic block diagram of a communications device 700 according to an embodiment of this application. As shown in FIG. 12, the communications device 700 includes a processor 710 and a memory 720. The memory 720 may store program code, and the processor 710 may execute the program code stored in the memory 720.

Optionally, as shown in FIG. 12, the communications device 700 may include a transceiver 730, and the processor 710 may control the transceiver 730 to communicate with the outside.

Optionally, the processor 710 may invoke program code stored in the memory 720, to perform corresponding operations of the network device in the method embodiment. For brevity, details are not described herein again.

Optionally, the processor 710 may invoke program code stored in the memory 720, to perform corresponding operations of the terminal device in the method embodiment. For brevity, details are not described herein again.

It should be understood that, the processor of this embodiment of this application may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other schemes. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A wireless communication method, comprising:
   determining, by a network device, a parameter set for performing paging to a terminal device, wherein the determined parameter set is one of a first parameter set and a second parameter set, and wherein the first parameter set is dependent on a parameter set used for actually sending a synchronization signal block, and the second parameter set is not dependent on the parameter set used for actually sending the synchronization signal block;
   sending, by the network device, first information to the terminal device, wherein the first information is used for indicating the determined parameter set; and
   performing, by the network device, paging to the terminal device at a specific frequency point using the determined parameter set,
   wherein the first parameter set further comprises a first time location used for performing paging, and the second parameter set further comprises a second time location used for performing paging; and
   wherein the performing, by the network device, paging to the terminal device comprises:
      sending, at the first time location or the second time location, a PDCCH used for paging.

2. The method according to claim 1, wherein determining, by the network device, the parameter set for performing paging to the terminal device comprises:
   determining, by the network device, a scheme of performing paging to the terminal device, wherein the determined scheme is one of a first scheme and a second scheme, wherein
   in the first scheme, the first parameter set is used for performing paging at the specific frequency point, and in the second scheme, the second parameter set is used for performing paging at the specific frequency point; and
   performing, by the network device, paging to the terminal device at the specific frequency point using the determined parameter set comprises:

performing, by the network device, paging to the terminal device at the specific frequency point according to the determined scheme.

3. The method according to claim 1, wherein the first information is carried in remaining minimum system information RMSI, or a radio resource control RRC message.

4. A wireless communication method, comprising:
receiving, by a terminal device, first information from a network device, wherein the first information is used for indicating a parameter set;
determining, by the terminal device based on the first information, the parameter set for the network device to perform paging to the terminal device, wherein the determined parameter set is one of a first parameter set and a second parameter set, and wherein the first parameter set is dependent on a parameter set used for actually sending a synchronization signal block, and the second parameter set is not dependent on the parameter set used for actually sending the synchronization signal block; and
monitoring, by the terminal device at a specific frequency point using the determined parameter set, paging performed by the network device to the terminal device, wherein the first parameter set further comprises a first time location used for performing paging, and the second parameter set further comprises a second time location used for performing paging; and
wherein the monitoring, by the terminal device, paging performed by the network device to the terminal device comprises:
monitoring, by the terminal device at the first time location or the second time location, a PDCCH used for paging.

5. The method according to claim 4, wherein determining, by the terminal device based on the first information, the parameter set for the network device to perform paging to the terminal device comprises:
determining, by the terminal device, a scheme in which the network device performs paging to the terminal device, wherein the determined scheme is one of a first scheme and a second scheme, wherein
in the first scheme, the first parameter set is used for performing paging at the specific frequency point, and in the second scheme, the second parameter set is used for performing paging at the specific frequency point; and
monitoring, by the terminal device at the specific frequency point using the determined parameter set, paging performed by the network device to the terminal device comprises:
monitoring, by the terminal device at the specific frequency point according to the determined scheme, paging performed by the network device to the terminal device.

6. The method according to claim 4, wherein the first information is carried in remaining minimum system information RMSI, or a radio resource control RRC message.

7. A network device, comprising: a memory configured to store computer-executable instructions; and
one or more processors in communication with the memory and configured to execute the computer-executable instructions;
one or more transceivers;
wherein the one or more processors is configured to:
determine a parameter set for performing paging to a terminal device, wherein the determined parameter set is one of a first parameter set and a second parameter set, and wherein the first parameter set is dependent on a parameter set used for actually sending a synchronization signal block, and the second parameter set is not dependent on the parameter set used for actually sending the synchronization signal block;
send first information to the terminal device, wherein the first information is used for indicating the determined parameter set; and
perform paging to the terminal device at a specific frequency point using the determined parameter set using the one or more transceivers,
wherein the first parameter set further comprises a first time location used for performing paging, and the second parameter set further comprises a second time location used for performing paging; and
wherein the one or more processors is further configured to:
send, at the first time location or the second time location, a PDCCH used for paging using the one or more transceivers.

8. The network device according to claim 7, wherein the one or more processors is further configured to:
determine a scheme of performing paging to the terminal device, wherein the determined scheme is one of a first scheme and a second scheme, wherein in the first scheme, the first parameter set is used for performing paging at the specific frequency point, and in the second scheme, the second parameter set is used for performing paging at the specific frequency point; and
perform paging to the terminal device at the specific frequency point according to the determined scheme using the one or more transceivers.

9. A terminal device, comprising: a memory configured to store computer-executable instructions; and
one or more processors in communication with the memory and configured to execute the computer-executable instructions;
one or more transceivers;
wherein the one or more processors is configured to:
receive first information from a network device, wherein the first information is used for indicating a parameter set;
determine, based on the first information, the parameter set for the network device to perform paging to the terminal device, wherein the determined parameter set is one of a first parameter set and a second parameter set, and wherein the first parameter set is dependent on a parameter set used for actually sending a synchronization signal block, and the second parameter set is not dependent on the parameter set used for actually sending the synchronization signal block;
monitor, at a specific frequency point using the determined parameter set, paging performed by the network device to the terminal device,
wherein the first parameter set further comprises a first time location used for performing paging, and the second parameter set further comprises a second time location used for performing paging; and
wherein the one or more processors is further configured to:
monitor, at the first time location or the second time location, a PDCCH used for paging.

10. The terminal device according to claim 9, wherein the one or more processors is further configured to:

determine a scheme in which the network device performs paging to the terminal device, wherein the determined scheme is one of a first scheme and a second scheme, wherein in the first scheme, the first parameter set is used for performing paging at the specific frequency point, and in the second scheme, the second parameter set is used for performing paging at the specific frequency point; and monitor at the specific frequency point according to the determined scheme, paging performed by the network device to the terminal device.

\* \* \* \* \*